INVENTOR.
BILLIE D. RANDALL
BY John H. Widdowson
ATTORNEY

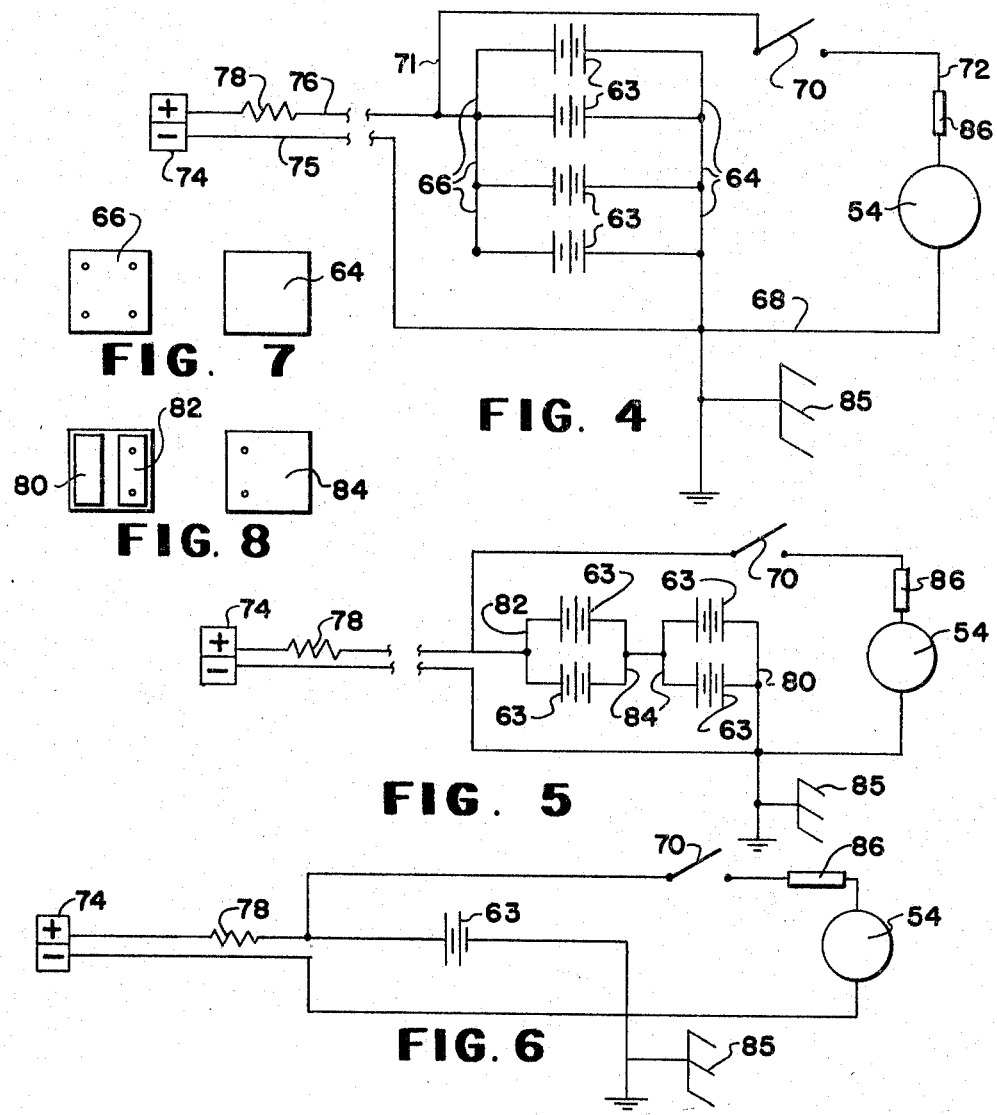

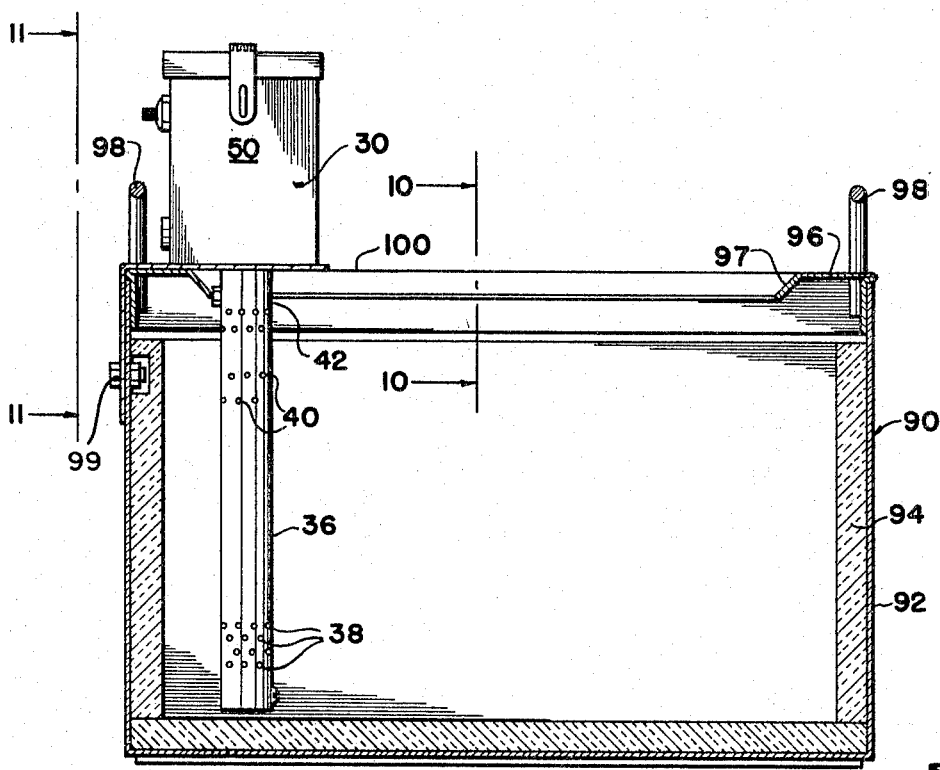
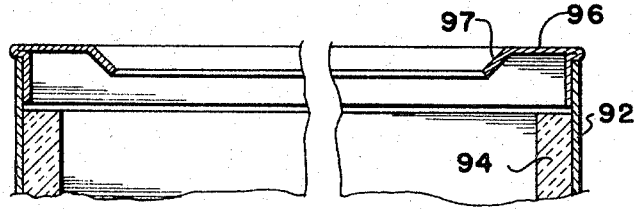
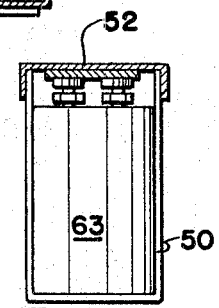
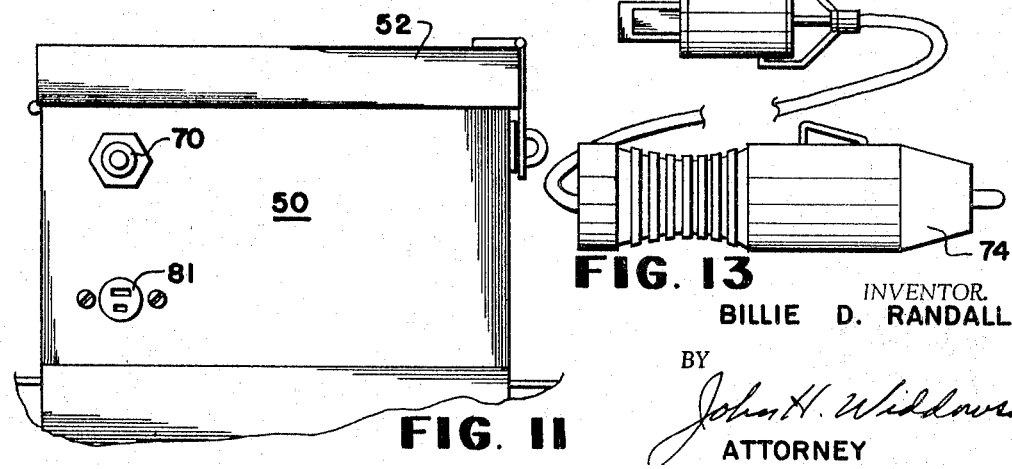
INVENTOR.
BILLIE D. RANDALL
BY John H. Widdowson
ATTORNEY United States Patent Office 3,323,249
Patented June 6, 1967

3,323,249
AERATED LIVE BAIT CONTAINER
Billie D. Randall, Yates Center, Kans.
(811 State St., Apt. 1, Emporia, Kans. 66801)
Filed Mar. 16, 1964, Ser. No. 351,982
4 Claims. (Cl. 43—57)

This invention relates to combining liquids and gases. More specifically, this invention relates to apparatus for combining liquids and gases. The invention relates to apparatus for aerating liquids. More specifically, the invention relates to an apparatus having an upright elongated mixing chamber with a novel means to supply gas and liquid to same and adapted to intimately mix the gas and liquid within and subsequently expel the mixture. The invention also relates to apparatus for combining a gas and liquid, which apparatus is useful for storing live fishing bait, purifying water, and activating sludge processes and sewage disposal.

Apparatus for combining gases and liquids are old in the art. In particular, apparatus to combine air and water to aerate the water in live bait storage devices are old. However, these combining apparatus, and in particular aerating devices for live bait storage apparatus, have not been completely satisfactory in operation and in efficiency. In the care and handling of fish or other live bait, it is necessary to provide a way of continuously dissolving oxygen in, and liberating carbon dioxide from the water in which fish and other live bait live. Fish consume the oxygen initially dissolved in water and will yield carbon dioxide to the water. Failure to replenish the oxygen will suffocate the fish. In some instances, where limited numbers of fish are kept in pools or large aquariums it is possible to grow vegetable matter in the water which will yield oxygen to the water and absorb carbon dioxide from the water. In many instances, a mechanical device can be provided to facilitate the dissolution of oxygen in the water. Such devices are used on portable live bait storage containers and the like. The known devices for aerating live bait storage containers, aquariums, and the like have not been satisfactory. These devices are often bulky and heavy. Also they do not do an efficient job of adding a sufficient amount of oxygen to the water. In general, the thinner the film or smaller the drops of water, and the longer and more intimate the contact between the water and air, the better the result. The present mechanical devices for agitating water and bubbling air through the water do not approach the aforementioned objectives. Further the apparatus known to the prior art for aerating water is expensive and not sufficiently dependable in operation.

Other apparatus which combine air and liquid, such as water purification apparatus, aerating apparatus, and sewage disposal devices known to the prior art have not been entirely satisfactory. These devices, in general, are inefficient, bulky, expensive, and often undependable in operation.

Methods of combining air or other gases and liquid are also old in the art. However, the known methods of combining air and liquid, in particular methods for aerating water, have not been entirely satisfactory. The known methods of aerating water in general consist of bubbling air through liquid or pumping streams of liquid through still air. With such known methods sufficient intimate contact between the liquid and air is not obtained. Consequently the efficiency is relatively low. Thus, it requires larger and more expensive equipment to achieve the desired volume and degree of aeration.

The combining apparatus of my invention has an upright elongated mixing chamber, a means to supply air or other gases to the interior of the chamber, and also a means to supply a stream of liquid to the interior of the chamber. Preferably the streams of air, or other gases, and liquid are introduced adjacent each other in the upper portion of the chamber. A means is also provided to intimately mix the air and liquid introduced within the chamber. An outlet opening is provided for exhausting the resultant liquid and air mixture from the chamber.

A preferred specific embodiment of my invention is an aerating apparatus. This apparatus has a container with an upright elongated hollow tube positioned therein, with the lower end submerged in liquid to be aerated contained in the container. The tube has an outlet means in the lower end, a plurality of relatively small inlet apertures in the intermediate portion, and an inlet means adjacent the upper portion. A power means is provided to substantially depress the liquid level in the tube below the prevailing liquid level in the tank. Liquid streams are introduced through the plurality of inlet apertures, and air through the inlet means and intimately mixed within the tube. After the liquid and air has been thoroughly mixed in the resultant turbulent atmosphere in the tube it is forced out of the tube through the outlet adjacent the bottom thereof. The resultant mixture consists of completely aerated water and cooled air. This aerated liquid when forced into the container provides dissolved oxygen in the main body of water and the cooled air absorbs heat from the water or other liquid contained in the container.

The use of the apparatus for combining a gas and the liquid of my invention involves forcing a stream of gas into the upper portion of an elongated upright chamber while simultaneously forming a stream of liquid into the chamber adjacent the stream of gas. The gas and liquid introduced in the chamber is continuously mixed in the resultant turbulent environment within the chamber. Subsequently the gas and liquid mixture is expelled from the chamber.

A preferred embodiment of my invention is apparatus for aerating liquid. In use of my apparatus for aerating liquid the liquid level in an upright elongated chamber immersed in a body of liquid to be aerated is depressed below the prevailing level of the body of liquid. The chamber has an outlet adjacent the bottom thereof. Liquid to be aerated is forced from the body of liquid into the upper portion of the chamber in a plurality of relatively small streams. Simultaneously air is forced into the upper portion of the chamber. The liquid and air thus introduced are continuously and thoroughly mixed in the resultant turbulent environment in the chamber thereby causing aeration of the liquid. The resultant aerated mixture is then forced out through the outlet opening in the bottom of the chamber and combined with the body of liquid. The depressed liquid level is continuously maintained in the chamber.

The apparatus of my invention for combining gas and liquid is more efficient in operation than apparatus and methods known to the prior art. In my apparatus the liquid and gas is intimately contacted within an elongated hollow chamber. The proportion of gas to liquid is relatively high, with the liquid broken down into small droplets in the resultant turbulent environment in the chamber.

In various embodiments of my apparatus the air and liquid mixture is further intimately contacted by either an impeller which provides a turbulent environment, or by introducing the air and liquid in the chamber under pressure. In both of these instances the tendency for air to dissolve in the liquid or water is greatly intensified. Due to the greater efficiency of the mixing, a smaller apparatus can be used to produce the desired volume and concentration. Consequently the apparatus is less expensive and in many instances it costs less to operate because of decreased power requirements. In particular the live bait storage devices of my invention are designed to be easily assembled, disassembled or repaired. The elements of the devices are easy and simple to manufacture and assemble. This reduces the cost. Further the apparatus are adapted to be portable and utilize either dry cell storage batteries or the like, or in alternative to use an auxiliary electrical supply to power the motor and recharge the batteries.

The apparatus for combining liquid and air of my invention eliminates many problems associated with combining liquid and gases known to the prior art. In my apparatus, the liquid and gases are intimately and efficiently mixed. The liquid is broken down into fine droplets and intimately contacted with the gas or air in a very turbulent environment. This action is very advantageous in particular in the aeration of water, a specific embodiment of my invention. In specific embodiments of my apparatus air and water are contacted either under pressure, which increases the capability of water to absorb air or other gases, or a very turbulent condition is produced wherein air is violently mixed with water when the impeller is rotated at the lower end of the elongated chamber.

An object of the invention is to provide a new apparatus for combining liquid and gas.

Another object of this invention is to provide apparatus adapted to efficiently aerate liquids.

Yet another object of this invention is to provide apparatus particularly adapted for use on portable live bait containers to provide a favorable environment for live bait.

Still another object of this invention is to provide apparatus for aerating water that is efficient in operation.

Another object of this invention is to provide apparatus for purifying liquids by aerating same that is simple to construct and maintain.

Still another object of this invention is to provide an apparatus for combining liquid and gas having an elongated mixing chamber that is adapted in use to intimately contact air and liquids.

Still another object of this invention is to provide an apparatus for aerating water that is adapted to also efficiently cool the water being aerated.

Still another object of this invention is to provide a live bait storage apparatus that will dependably and efficiently aerate the water in the storage apparatus and also maintain the temperature thereof to provide a favorable enviroment for live bait.

Still another object of this invention is to provide an apparatus for combining air and liquid that is adapted to cool the liquid.

Other objects and advantages of the apparatus of my invention will become apparent to those skilled in the art upon reading the disclosure.

Drawings accompany and are a part of this disclosure. These drawings depict preferred specific embodiments of the apparatus for combining liquid and water of my invention and it is to be understood that such drawings are not to unduly limit the scope of my invention. In the drawings:

FIG. 4 is a circuit diagram of a specific embodiment illustrating the arrangement of the batteries and cord to an auxiliary electrical supply for powering the electric motor utilized in the embodiment of FIG. 1.

FIG. 5 is a circuit diagram of still another specific embodiment of an analogous arrangement for powering the electric motor of the aerating apparatus.

FIG. 6 is a circuit diagram of still another specific embodiment of my invention.

FIG. 7 is a detail view of the battery contacts utilized in the circuit embodiment depicted in FIG. 4.

FIG. 8 is a detail view of the battery contact plates utilized in the second embodiment illustrated in FIG. 5.

FIG. 9 is another preferred specific embodiment of a live bait storage device of my invention particularly adapted to be utilized in a boat well or the like.

FIG. 10 is a detail view in cross section taken on line 10—10 of FIG. 9.

FIG. 11 is an enlarged detail view of the housing taken on line 11—11 of FIG. 9.

FIG. 12 is a cross sectional view of the housing depicted in FIG. 11.

FIG. 13 is an enlarged view depicting a preferred embodiment of an extension cord for utilizing an auxiliary electrical supply for energizing the electric motor in the aerating apparatus.

Figure 1:
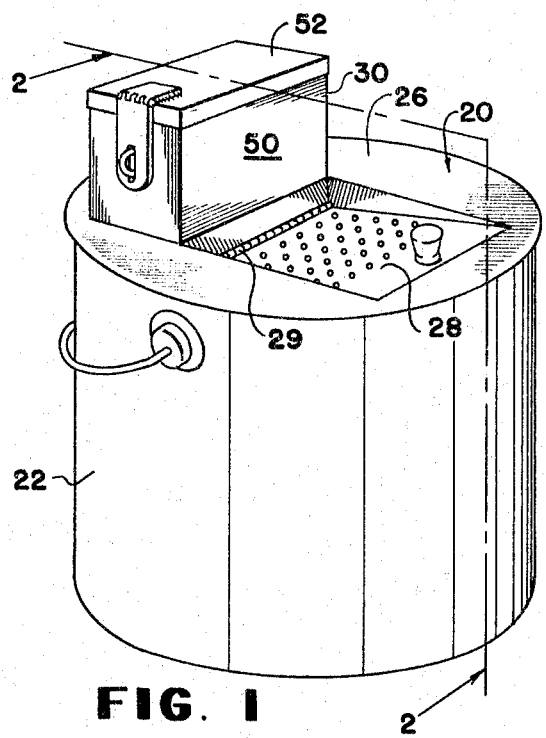
FIG. 1 is a perspective view of a preferred specific live bait storage apparatus embodiment of my invention.

The following is a discussion and description of the apparatus for combining gas and liquid of my invention made with reference to the drawings, wherein the same reference numerals are used to indicate the same or similar parts and/or structure. The discussion and description is of preferred specific embodiments of the apparatus of my invention and it is to be understood that such is not to unduly limit the scope of my invention.

Figure 2:
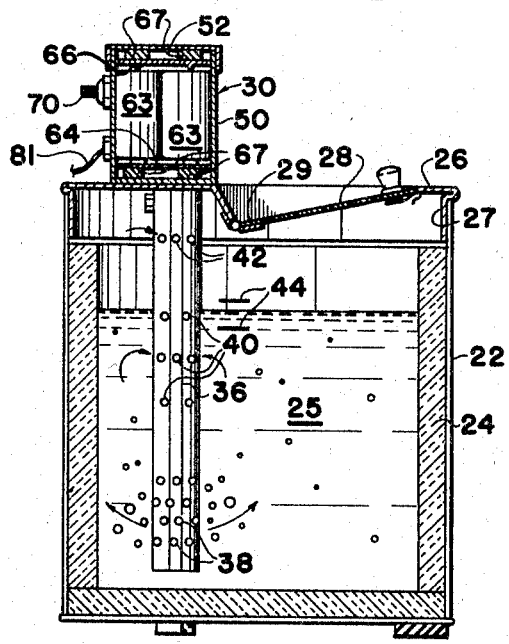
FIG. 2 is a cross sectional view taken on line 2—2 of FIG. 1.
Figure 3:
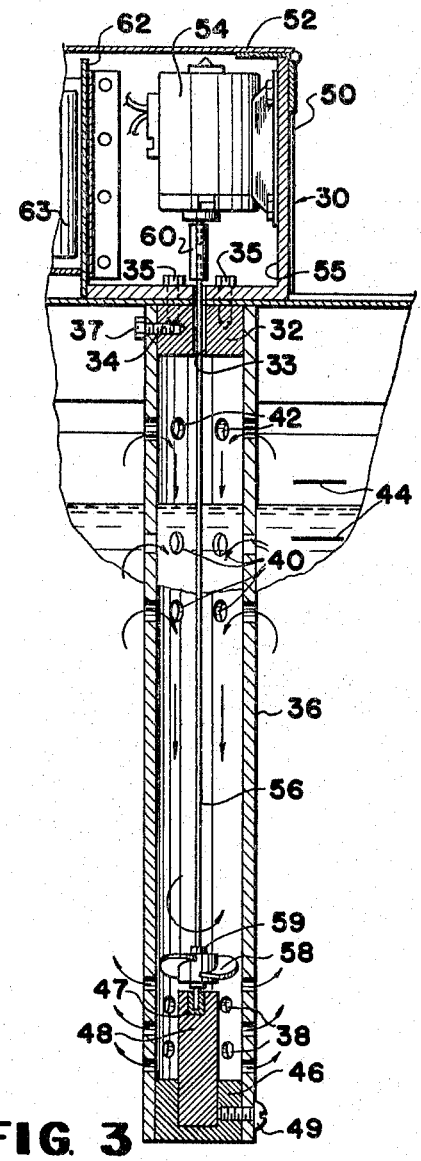
FIG. 3 is an enlarged detail view in cross section of the aerating device of the specific embodiment illustrated in FIG. 1.

Referring now to the drawings, FIGS. 1–13, there is illustrated in FIGS. 1 through 4 a preferred specific embodiment of my invention. The preferred specific embodiment of my invention is a live bait storage apparatus 20, particularly adapted to keep bait minnows alive and fresh for extended periods of time. The unit aerates, circulates, recirculates, and cools water to provide a very favorable environment for keeping bait minnows alive and fresh. The live bait storage device 20 has a cylindrically shaped container 22 adapted to hold water. The container 22 is provided with a liner element 24 of a closed cell plastic foam material that lines the bottom and upright walls of the container 22. The lining material can be any suitable material, and is preferably a foam material such as foam polyethylene, foam polypropylene, or the like. The lining 24 serves to keep the water 25 in the container 22 cool by insulating it from the surrounding air, and also to reduce the noise and vibration caused by the aerating apparatus which will be described hereinafter. If desired the lining 24 can be in separate side and bottom sections, or as a unitary element. A plurality of foam rubber strips are secured to the bottom of container 22 to dampen vibration noises during operation. A circular shaped container cover 26 having a downwardly extending peripheral flange 27 covers the open top of container 22. The flange 27 is seated within the container 22 to maintain the cover 26 in frictional engagement therewith. A sloping door 28 which may be perforated is mounted on cover 26 with hinges 29. Preferably the door 28 is positioned off-center of cover 26 in order to provide a flat portion on the cover. An aerating and cooling apparatus 30 is mounted on cover 26 as illustrated in FIGS. 1 and 2 on the flat portion previously mentioned. The aerating and cooling apparatus 30 has a cylinder mount 32 that has a central aperture 33 and a transverse threaded aperture 34. The aeration apparatus is best illustrated in FIG. 3. The cylinder mount 32 is secured to the cover 26 by bolts 35 extending through the cover 26 and secured to the cylinder mount. An elongated cylinder 36 is secured to the cylinder mount 32 by a transverse bolt 37 extending through cylinder 36 and secured in aperture 34. The cylinder 36 has a plurality of apertures 38 in the lower end, a plurality of apertures 40 in the intermediate portion below the normal operating level, and a plurality of apertures 42 in the upper portion above the normal operating level in the container. Preferably the container lining is provided with marks 44 to indicate the desired normal operating water level. A bushing mount 46, having a central aperture is mounted on the lower end of cylinder 36. A cylindrically shaped bushing 48, having a central bore 47, is seated in the central aperture in bushing mount 46. A transverse bolt 49 extending through the cylinder 36, the bushing mount 46 and engaging the bushing 48 secures the elements in assembled relationship. A rectangular shaped housing 50 is mounted on the top side of cover 26 in overlying relationship to cylinder 36. A lid 52 is provided for the housing 50 which is preferably pivotally secured to the housing. A direct current electric motor 54 having a protruding drive shaft is mounted on an upright wall of housing 50 with the drive shaft in alignment with the longitudinal axis of cylinder 36. If desired an angle bracket 55 made of heavier material than the major portion of housing 50 can be used to support the motor 54. The angle bracket 55 can also serve as the bottom and one side of the housing 50. An elongated shaft 56 extends through cover 26, aperture 33 in the cylinder mount 32, and has the lower end thereof seated in the central bore 47 of bushing 48. An impeller 58 having a central aperture is mounted on the lower end portion of shaft 56 and is positioned slightly above the plurality of apertures 38 in the lower portion of the cylinder 36. A bushing sleeve 59 of a resilient plastic material is snugly seated in the aperture in the impeller 58 and is disposed about shaft 56 to frictionally secure the impeller to the shaft. If desired, the impeller 58 can be secured to shaft 56 by other means such as set screws, etc. A sleeve 60 of a resilient material connects the drive shaft of motor 54 and the upper end of shaft 56 in driving relation. A wall 62 is provided in housing 50 to enclose a space to house four upright dry cell batteries 63. A circuit means is provided for selectively supplying electrical current to motor 54. The circuit means consists of an insulated metal plate 64 mounted on the bottom of the housing 50, and another insulated plate 66 resiliently mounted on the lid 52 of the housing 50. The plates 64 and 66 are secured, preferably by bonding, to a suitable insulation board preferably adhered to a foam rubber strip 67 in turn supported by the associated portions of the housing 50. The plates 64 and 66 are shown in FIG. 7 of the drawings. The circuit diagram for the electrical circuit means is depicted in FIG. 4. A conductor 68 is connected to the plate 64 and a first terminal of motor 54. An electrical switch 70 is provided. A conductor means 71 is connected to the second plate 66 and a first terminal of the switch 70. Conductor means 72 is connected to the second terminal of switch 70 and the second terminal of motor 54. A means to utilize an auxiliary direct current electrical supply can also be provided. This means is a plug-in receptacle 74, preferably of the type adapted to plug into a cigarette lighter of an automobile or the like. Conductor means 75 connects a first terminal of receptacle 74 and the first terminal of motor 54. A second conductor means 76 connects the second terminal of receptacle 74 and the first terminal of switch 70. When the auxiliary electrical supply is of a voltage greater than the voltage developed by the batteries 63 a resistor 78 can be placed in series in conductor 76 in order to provide a voltage drop for normal motor operation and for the re-charging of discharged or partially discharged batteries. If desired, the conductors 75 and 76 can be connected to a plug-in connector 83 preferably polarized of the type depicted in FIG. 13 which is in turn adapted to be plugged into an inlet 81 preferably with polarized contacts mounted on housing 50. The means to utilize an auxiliary electrical supply can be used to either operate the motor 54 to conserve the batteries, or it can also be used to recharge the batteries 63. The motor 54 in operation is adapted to rotate the impeller 58 to force the water out of the cylinder 36 through the apertures 38 in the lower portion of the cylinder. This substantially lowers the water level in the cylinder 36 below the prevailing water level in the container 22. When the water level in the cylinder is depressed and maintained, water from the container is drawn in through the apertures 40 in the intermediate portion of the cylinder and air through the apertures 42 in the upper portion of the cylinder. The cross sectional area of the apertures 38 and apertures 40 must be carefully adjusted so that the impeller can maintain the depressed water level. The relative size of the apertures is also related to the power output of the motor 54. The middle perforated section below the waterline of cylinder 36 is so constructed to restrict water flow back into the cylinder. The water level within the cylinder is thus lowered when the impeller is turning at normal speeds. Water streaming into the cylinder mixes with the air being pulled in through the upper perforated section through apertures 42. This mixing action tends to cool the mixing air through the operation. The mixture of air and water is in turn forced out of the lower perforated section through apertures 38 by the driving impeller or propeller 58. The cooler air bubbling to the top of the water transfers any heat picked up from the water back into the atmosphere. Water within the container is thus aerated, circulated, recirculated, and cooled while the unit is in operation. The action of the impeller 58 adjacent the water level in the cylinder provides a very turbulent condition which will further intimately mix the air and water to achieve the aforementioned objectives.

In FIG. 5 is another preferred specific embodiment of a circuit means for supplying electrical current to 54. This circuit arrangement can be utilized in the housing 50 depicted in the embodiment illustrated in FIG. 1. In this embodiment, four batteries 63 are arranged so that two pair are connected in series to provide a higher voltage to the motor 54. In this embodiment a resiliently mounted insulated plate 80 overlies approximately one-half the floor of the compartment in housing 50. A second resiliently mounted plate 82 is mounted in close proximity to plate 80 and is insulated therefrom. Another plate 84 is mounted in the lid 52 of the housing and overlies both plates 80 and 82. With this arrangement plate 84 bridges the positive terminals of the first pair of batteries with the negative set of terminals in the second pair of batteries. The plate 84 in lid 52 does not need any electrical connections. The rest of the circuit in FIG. 5 is basically the same as that depicted in FIG. 4. If desired or necessary the negative terminal of the battery can be grounded to the vehicle with ground 85.

In FIG. 6 is shown still another specific embodiment of a circuit means for providing electrical current to the motor 54 of the aerating apparatus 20. In this embodiment only a single battery is used. Appropriate terminals can be placed in either the lid, the side or the bottom of the housing to operatively connect the battery terminals to the circuit. Quick disconnect clips 86 can be used to connect the terminals of the motor 54 with the various conductors in the electrical circuits.

Another preferred specific embodiment of a portable, aerated, cooled and insulated live bait storage apparatus 90 is depicted in FIGS. 9 through 12. The storage apparatus 90 has an upright container 92 having a rectangular cross section and adapted to hold water. A foam material lining 94 is disposed on the bottom and upright walls of container 92. The lining 94 can be of any suitable type of material adapted to insulate and reduce the noise of the aerator apparatus. If desired, the lining 94 can be in sections, or a unitary single element. The container 92 has an inwardly directed peripheral flange 96 on the top serving as a splash guard. The peripheral flange 96 has an innermost peripheral portion 97 that is sloped downwardly. Two upwardly extending U-shaped handles 98 are suitably secured to the container 92. The flange 96 can be provided with a downwardly extending peripheral flange which engages the container 92 or the flange can be unitary if desired. A rectangular plate 100 is mounted on the inwardly directed flange 96 and secured as by a bolt 99 to an end sidewall of the container 92 and overlies an end portion of the container 92. An aerating apparatus 30 is mounted on the plate 100, which apparatus has a perforated cylinder 36, a motor 54, and a means to activate the motor. The constructions of the aerating apparatus 30 is basically the same as the aerating apparatus 30 described in connection with the embodiment shown in FIGS. 1, 2 and 3. In FIG. 12 is depicted a preferred embodiment of a cross sectional view of the housing 50. The electrical contacts for contacting the electrodes of the battery 63 are resiliently mounted on the lid 52 of the housing 50. These contacts can be replaced with electrical leads connectible to the battery with an insulation material on the cover of housing 50 to prevent the battery contacts from shorting. Suitable conductors are connected to the switch 70 and electrical motor 54, also housed in housing 50. The operation of the embodiment depicted in FIGS. 9, 10 and 11 is basically the same as the operation described in the embodiment of FIGS. 1, 2 and 3.

The use of the apparatus of my invention for conditioning water in a live bait storage container involves rapidly rotating an impeller disposed in the lower portion of an upright perforated tubular element immersed in water to be conditioned to continuously drive the water from the lower portion of the tubular element. The streams of air and water are continuously drawn into apertures in the upper portions of the tubular element and are thoroughly mixed in the resultant turbulent environment. The water level in the tubular element is maintained at a depressed level slightly above the impeller by rotation of same. A portion of the water added to the tubular element is evaporated which cools the mixture of air and water. Also taking place in the tubular element is a thorough aeration of the water. The water and air is then forced out of the tubular element below the surface of the water into the container, whereupon the cooled air absorbs heat from the water, and the cooled and aerated water is combined with the water in the container to thereby cool and aerate same by dilution.

The use of the apparatus of my invention for purifying liquid involves continuously forcing air under pressure into the upper end of an upright elongated chamber immersed in liquid to be purified. The chamber has an outlet opening in the bottom portion. Liquid is also continuously pumped from the body of liquid having the tubular element immersed therein, into the upper portion of the tubular element in fine high velocity streams. The liquid level in the tubular element is maintained at the level of the outlet openings. The liquid and air is continuously and thoroughly mixed in the resultant turbulent atmosphere thereby causing aeration of the liquid and causing a portion of the liquid to evaporate to thereby cool the air and liquid mixture. The liquid to be purified in the body of liquid outside the tubular element is contacted with the resultant cooled air. Heat is transferred to the air from the liquid. The resultant aerated liquid is mixed with the liquid to be purified.

As will be obvious to those skilled in the art various changes and modifications of the preferred apparatus for combining air and liquid as disclosed herein can be made or followed without departing from the spirit of the disclosure or from the scope of the claims.

I claim:

1. A portable, aerated, cooled and insulated live bait storage device comprising, a cylindrically shaped container adapted to hold water having a closed cell foam material lining on the bottom and upright wall, a pivotal handle, and a plurality of spaced plastic foam strips on the outside bottom surface, a circular shaped container cover having a downwardly extending annular flange spaced inwardly from the edge thereof, said flange seated within said container to maintain said cover in frictional engagement therewith, a sloping door mounted in said cover, hinges securing said door to said cover, an aerating and cooling apparatus mounted on said cover comprising, a cylinder mount having a central aperture and a transverse threaded aperture, bolts extending through said cover rigidly securing said mount on the underside of said cover in spaced relation to said door, an elongated cylinder having a plurality of apertures in the lower end thereof, a plurality of apertures in the intermediate portion below the normal operating water level, and a plurality of apertures in the upper portion above the normal operating water level in the container, a bolt extending through said cylinder and engaged in said transverse threaded aperture in said cylinder mount securing said cylinder to said cylinder mount, a bushing mount having a central aperture mounted in the lower end of said cylinder, a cylindrically shaped bushing having a central bore seated in the central aperture in said bushing mount, a transverse bolt extending through apertures in said cylinder and bushing mount, securing said cylinder, bushing mount, and bushing in assembled relationship, a rectangular shaped housing secured to the top side of said cover in overlying relationship to said cylinder, a lid for said housing, hinges pivotally securing said lid to said housing, a direct current electrical motor having a protruding drive shaft mounted on an upright wall of said housing with said shaft in alignment with said aperture in said cylinder mount on said cover, an elongated shaft extending through said cover and aperture in said cylinder mount and having a lower end seated in the central bore of said bushing mounted in the lower end of said cylinder, an impeller having a central aperture mounted on the lower end portion of said shaft positioned slightly above the plurality of apertures in the lower portion of said cylinder, a bushing sleeve of resilient plastic material snugly seated in the aperture in said impeller and disposed about said shaft frictionally securing said impeller to said shaft, a sleeve of resilient plastic material connecting said drive shaft of said motor and the upper end of said shaft in said cylinder in driving relation, a wall in said housing enclosing a space to house four upright dry cell batteries, circuit means for selectively supplying electrical current to said motor comprising, an insulated metal plate on the bottom of the portion of the housing adapted to receive batteries, a conductor connecting said plate and a first terminal of said motor, a second insulated plate mounted in the lid of said housing adapted to engage terminals of dry cell batteries disposed therein, an electrical switch, conductor means connecting said second plate and a first terminal of said switch, conductor means connecting the second terminal of said switch and the second terminal of said motor, and a means to utilize an auxiliary direct current electrical supply comprising, a plug-in type receptacle for connection to the auxiliary electrical supply, conductor means connecting a first terminal of said receptacle to the first terminal of said motor, conductor means connecting the second terminal of said receptacle to the first terminal of said switch, said motor in operation adapted to rotate said impeller to force water out of the cylinder through apertures in the lower portion of the cylinder to substantially lower the water level in the cylinder below the prevailing water level in the container, and continuously draw water through the apertures in said intermediate portion of said cylinder and air through the apertures in the upper portion of the cylinder, throughly mix the water and air thereby aerating the water, and cause partial evaporation and consequent cooling of the water, and subsequently circulating the aerated and cooled water throughout said container to thus provide a favorable environment for live bait.

2. An apparatus for storing live bait, comprising, a cylindrically shaped container adapted to hold water, a cover having a downwardly extending flange, said flange seated within said container to maintain said cover in frictional engagement therewith, a door mounted in said cover, hinges securing said door to said cover, an aerating and cooling device mounted on said cover comprising, an annular cylinder mount, means securing said cylinder mount to the underside of said cover in spaced relation to said door, an elongated cylinder having a plurality of apertures in the lower end, a plurality of apertures in the intermediate portion below the normal operating water level, and a plurality of apertures in the upper portion above the normal operating water level in the container, a means to secure said cylinder to said cylinder mount, a bushing mount having a central aperture mounted in the lower end of said cylinder, a bushing having a central bore seated in the central aperture in said bushing mount, a means to secure said bushing mount to said cylinder, a housing secured to the top side of said cover in overlying relationship to said cylinder, a lid for said housing, a direct current electric motor having a protruding drive shaft mounted on an upright wall of said housing, said drive shaft positioned in alignment with the aperture in said annular cylinder mount, an elongated shaft extending through said cover and said cylinder mount and having a lower end seated in the central bore of said bushing, an impeller mounted on the lower end portion of said shaft positioned slightly above the plurality of apertures in the lower portion of said cylinder, a sleeve of resilient material connecting said drive shaft of said motor and the upper end of said shaft in said cylinder in driving relation, compartment means in said housing for holding a battery, circuit means for selectively supplying electrical current to said motor comprising, a switch, conductor means connecting a terminal of a battery in the compartment and a first terminal of said motor, a second conductor means connecting the opposite terminal of the battery and the first terminal of said switch, a third conductor means connecting the second terminal of said switch and the second terminal of said motor, a connector means to utilize an auxiliary direct current electrical supply for energizing said motor, said motor in operation adapted to rotate said impeller to force water out of the cylinder through apertures in the lower portion of the cylinder to maintain the water level in the cylinder below the prevailing water level in the container, and continuously draw water through the apertures in said intermediate portion of said cylinder and air through the apertures in the outer portion of said cylinder, thoroughly mix the water and air thereby aerating the water, and cause partial evaporation and consequent cooling of the resultant mixture, and subsequently circulating the aerated and cooled water throughout said container and thus provide a favorable environment for live bait.

3. A portable, aerated, cooled and insulated live bait storage apparatus comprising, an upright container having a rectangular cross section adapted to hold water, a closed cell foam material lining on the bottom and upright walls of said container, an inwardly directed peripheral flange on the top of said container, the innermost peripheral portion of said flange being sloped downwardly, upwardly extending U-shaped handles on each end of said container, a rectangular plate secured to said inwardly extending flange overlying an end portion of said container, an aerating apparatus mounted on said plate comprising, a cylinder mount having a central aperture and a transverse threaded aperture, bolts extending through said plate rigidly securing said mount on the underside of said plate, an elongated cylinder having a plurality of apertures in the lower end thereof, a plurality of apertures in the intermediate portion below the normal operating water level, and a plurality of apertures in the upper portion above the normal operating water level in the container, a bolt extending through said cylinder and engaged in said transverse threaded aperture in said cylinder mount securing said cylinder to said cylinder mount, a bushing mount having a central aperture and a transverse threaded aperture mounted in the lower end of said cylinder, a cylindrically shaped bushing having an upwardly facing central bore seated in the central aperture of said bushing mount, a transverse bolt extending through apertures in said cylinder and said bushing mount securing said cylinder, bushing mount, and bushing in assembled relationship, a rectangular shaped housing secured to the top side of said plate in overlying relationship to said cylinder, a lid for said housing, hinges pivotally securing said lid to said housing, a direct current electric motor having a vertically disposed protruding drive shaft mounted on the upright wall of said housing with said shaft in alignment with said central aperture in said cylinder mount, an elongated shaft extending through said plate and aperture in said cylinder mount and having a lower end seated in the central bore of said bushing mount in the lower end of said cylinder, an impeller having a central aperture mounted on the lower end portion of said shaft positioned slightly above the plurality of apertures in the lower portion of said cylinder, a bushing sleeve of resilient plastic material snugly seated in the aperture in said impeller and disposed about said shaft frictionally securing said impeller to said shaft, a sleeve of resilient plastic material connecting said drive shaft of said motor and the upper end of said elongated shaft in said cylinder in driving relation, a wall in said housing enclosing a space to house a dry cell battery, circuit means for selectively supplying electrical current to said motor from said battery, comprising, a first insulated plate on the lid adapted to engage a first terminal of said battery, a second insulated plate on the lid adapted to engage a second terminal of said battery, a conductor connecting said first plate and a first terminal of said battery, a switch having first and second terminals, conductor means connecting said second plate to a first terminal of said switch, conductor means connecting said second terminal of said switch and said second terminal of said battery, and a means to utilize an auxiliary direct current electrical supply comprising, a plug-in type receptacle for connection to an outlet of the auxiliary electrical supply, conductor means connecting a first terminal of said receptacle to the first terminal of said motor, conductor means connecting the second terminal of said receptacle to the first terminal of said switch, said motor in operation adapted to rotate said impeller to force water out of the cylinder through apertures in the lower portion of the cylinder to substantially lower the water level in the cylinder below the prevailing water level in the container, and continuously draw water through the apertures in said intermediate portion of said cylinder with the cross sectional area of said apertures in the intermediate portion adjusted to the proper size to permit maintenance of the lower level, and air through the apertures in the upper portion of the cylinder, thoroughly mix the water and air and thereby aerating the water, and cause partial evaporation and consequently cooling of the water, and subsequently circulating the aerated and cooled water through said container to thus provide a favorable environment for live bait.

4. A live bait storage apparatus comprising, an upright container, an insulated material lining the bottom and upright walls of said container, a plate on said container overlying a portion of the top thereof, an aerating apparatus mounted on said plate comprising, a cylinder mount having a central aperture, bolts extending through said plate rigidly securing said mount to the underside of said plate, an elongated cylinder having an outlet in the lower end, a plurality of apertures in the intermediate portion below the normal operating water level, and a plurality of apertures in the upper portion above the normal operating water level in the container, a bearing means having an upwardly facing central bore mounted on the lower end of said cylinder, a housing secured to the top side of said plate in overlying relationship to said cylinder, an electric motor mounted in said housing and having a vertically disposed drive shaft in axial alignment with said cylinder, an elongated shaft extending through said plate and aperture in said cylinder mount and having a lower end seated in central bore of said bearing, an impeller mounted on the lower end portion of said shaft, a sleeve of resilient material connecting said drive shaft of said motor and the upper end of said elongated shaft in driving relationship, compartment means in said housing to house a battery, a circuit means for selectively supplying electric current to said motor from said battery, and a means to utilize an auxiliary direct current electrical supply to drive said motor, said motor in operation adapted to rotate said impeller to force water out of the cylinder through the outlet in the lower portion of the cylinder to subsequently lower the water level in the cylinder below the prevailing water level in the container and continuously draw water through the apertures in the intermediate portion of said cylinder and air through the apertures in the upper portion of said cylinder, thoroughly mix the water and air thereby aerating the water, and subsequently circulate the aerated water through said container to thus provide a favorable environment for live bait.

References Cited

UNITED STATES PATENTS

| | | | |
|---|---|---|---|
| 2,137,397 | 11/1938 | Haldeman | 43—57 |
| 2,461,746 | 2/1949 | Lathrop et al. | 261—84 X |
| 2,471,573 | 5/1949 | Lumpkin | 43—57 |
| 2,613,472 | 10/1952 | Ebert | 43—56 |
| 2,951,309 | 9/1960 | Briscoe | 43—57 |
| 2,962,835 | 12/1960 | Clark | 43—56 |
| 2,998,671 | 9/1961 | Hinton | 43—57 |
| 3,189,334 | 6/1965 | Bell | 261—93 |
| 3,217,444 | 11/1965 | Howard | 43—57 |

SAMUEL KOREN, *Primary Examiner.*

WARNER H. CAMP, *Assistant Examiner.*